US011844309B2

(12) United States Patent
Franklin (10) Patent No.: US 11,844,309 B2
(45) Date of Patent: Dec. 19, 2023

(54) STRING TRIMMER HAVING A CURVED SHAFT SECTION FOR VARIABLE LENGTH AND OPERATOR HEIGHT

(71) Applicant: Douglas Franklin, Radford, VA (US)

(72) Inventor: Douglas Franklin, Radford, VA (US)

(73) Assignee: Douglas Franklin, Radford, VA (US)

( * ) Notice: Subject to any disclaimer, the term of this patent is extended or adjusted under 35 U.S.C. 154(b) by 501 days.

(21) Appl. No.: 17/077,183

(22) Filed: Oct. 22, 2020

(65) Prior Publication Data

US 2021/0368678 A1    Dec. 2, 2021

Related U.S. Application Data (60) Provisional application No. 63/033,307, filed on Jun. 2, 2020.

(51) Int. Cl.
| | | |
|---|---|---|
| *A01D 34/90* | (2006.01) | |
| *F16C 1/04* | (2006.01) | |
| *A01D 34/416* | (2006.01) | |
| *A01D 101/00* | (2006.01) | |

(52) U.S. Cl.
CPC ......... *A01D 34/902* (2013.01); *A01D 34/416* (2013.01); *F16C 1/04* (2013.01); *A01D 2101/00* (2013.01)

(58) Field of Classification Search
CPC .... A01D 34/90; A01D 34/902; A01D 34/412; A01D 34/416; A01D 34/4161–4168
USPC ...................................................... 30/296.1
See application file for complete search history.

(56) References Cited

U.S. PATENT DOCUMENTS

| | | | | |
|---|---|---|---|---|
| 2,747,384 | A * | 5/1956 | Beam ........................ | F16C 1/08 408/127 |
| 3,472,045 | A * | 10/1969 | Nelsen ................. | A61C 17/005 433/112 |
| 4,282,652 | A * | 8/1981 | Ballas, Sr. ........... | A01D 34/902 30/276 |
| 4,696,108 | A * | 9/1987 | Zerrer .................. | A01D 34/902 30/296.1 |
| 5,603,173 | A * | 2/1997 | Brazell ..................... | E01H 5/04 37/246 |
| 6,053,259 | A * | 4/2000 | Kojima ................ | A01D 34/902 173/171 |
| 8,117,756 | B2 * | 2/2012 | Nakaya ................ | A01D 34/902 30/296.1 |
| 8,127,455 | B2 * | 3/2012 | Wenckel ............... | A01D 34/902 30/296.1 |
| 2002/0116825 | A1 * | 8/2002 | Jarzombek ........... | A01D 34/902 30/297 |
| 2002/0121262 | A1 * | 9/2002 | Kawamoto ............. | F02B 63/02 123/196 W |

(Continued)

*Primary Examiner* — Adam J Eiseman
*Assistant Examiner* — Richard D Crosby, Jr.
(74) *Attorney, Agent, or Firm* — Duane Morris LLP (57) ABSTRACT

A lawn trimmer including a cutting disc, a drive shaft; and a flexible drive shaft. The drive shaft is within a straight shaft, connected to the motor and extending to the flexible drive shaft, translating the rotation of the motor to the flexible drive shaft. The flexible drive shaft is within a curved shaft, parallel but not-colinear with the straight shaft, extends to a rotor head connected to the curved shaft, translating drive shaft rotation to a cutting disc comprising a plurality of cutting blades on a cutting plane; an intersection between the cutting plane and the curved shaft axis defines a predetermined oblique angle.

20 Claims, 13 Drawing Sheets

(56) References Cited

U.S. PATENT DOCUMENTS

| | | | | |
|---|---|---|---|---|
| 2010/0064648 | A1* | 3/2010 | Koshihara | A01D 34/90 403/113 |
| 2011/0176759 | A1* | 7/2011 | Parris | F16C 1/26 384/218 |
| 2011/0179757 | A1* | 7/2011 | Scott-Stanbridge | A01D 34/78 56/320.1 |
| 2012/0180445 | A1* | 7/2012 | Duller | A01D 34/902 56/12.7 |
| 2013/0205572 | A1* | 8/2013 | Mascari | A22C 17/00 29/515 |
| 2013/0276314 | A1* | 10/2013 | Fukunaga | A01D 34/4165 173/162.1 |
| 2015/0083452 | A1* | 3/2015 | Rader | A01D 34/902 239/722 |
| 2016/0123375 | A1* | 5/2016 | Edgman | F16C 1/26 264/209.3 |
| 2018/0092297 | A1* | 4/2018 | Sunazuka | G01P 15/0891 |
| 2018/0119726 | A1* | 5/2018 | Weissert | F16C 3/03 |
| 2018/0220583 | A1* | 8/2018 | Günther | A01D 34/73 |
| 2019/0174740 | A1* | 6/2019 | Lambert | A01D 43/063 |
| 2019/0280639 | A1* | 9/2019 | Trinkle | A01D 34/416 |
| 2020/0406443 | A1* | 12/2020 | Hoffman | F16B 2/185 |
| 2022/0039315 | A1* | 2/2022 | Gay | A01D 34/416 |

\* cited by examiner

STRING TRIMMER HAVING A CURVED SHAFT SECTION FOR VARIABLE LENGTH AND OPERATOR HEIGHT

CROSS-REFERENCE TO RELATED APPLICATIONS

This application is a non-provisional of and claims priority of provisional application No. 63/033,370 filed May 30, 2020. The entirety of this application is herein incorporated by reference.

BACKGROUND

Figure 1A:
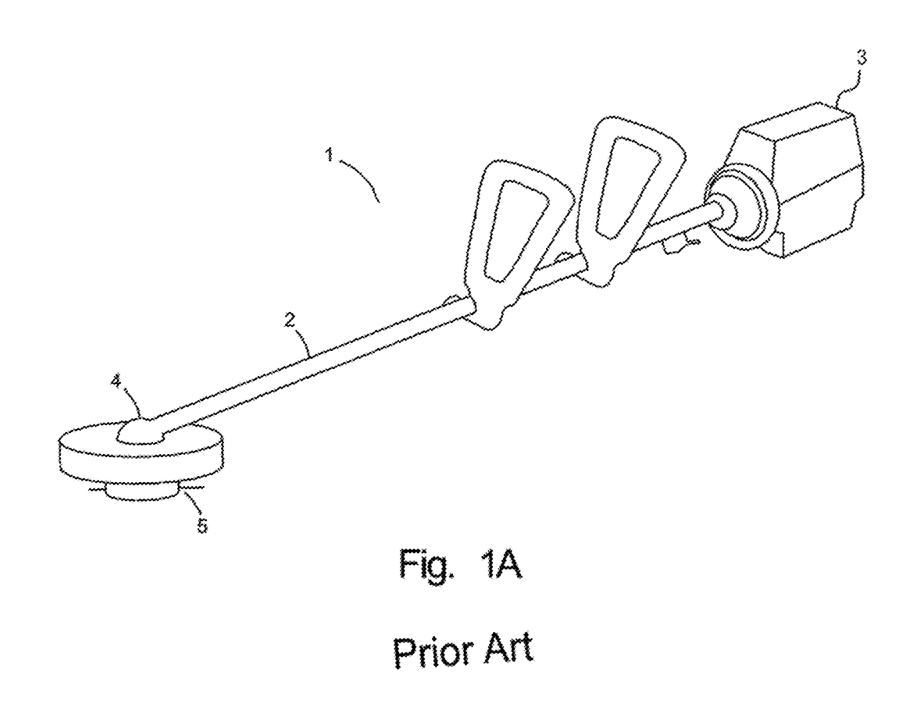
FIG. 1A is an illustration of a prior art string trimmer with a straight shaft.
Figure 1B:
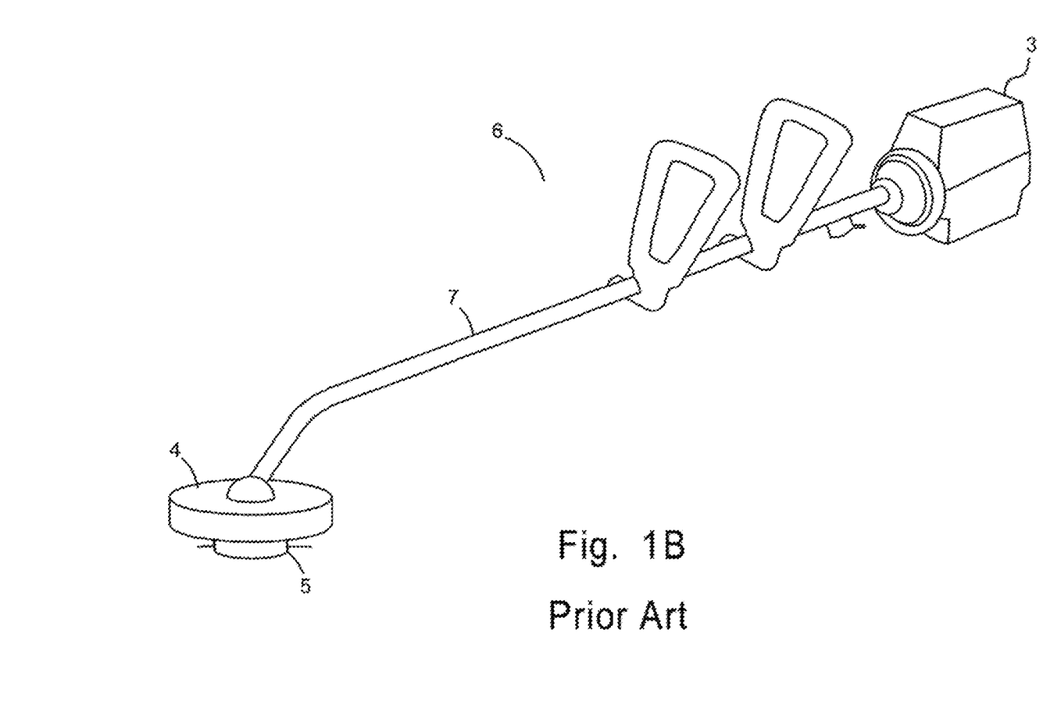
FIG. 1B is an illustration of a prior art string trimmer with a bent or curved shaft.

Current string trimmer typically utilize straight or bend shafts. These trimmers have a motor (electric or combustion engines) on one end of the shaft and a rotating cutting head at the other. FIG. 1A illustrates a prior art string trimmer 1 with a straight shaft 2. The straight shaft 2 transfers rotational energy from the motor 3 to the rotor head 4, which in turn transfers the energy to the cutting disc 5. Likewise FIG. 1B illustrates a prior art string trimmer 6 with a curved shaft 7. The curved shaft 7 transfers rotational energy from the motor 3 to the rotor head 4, which in turn transfers the energy to the cutting disc 5.

Figure 2A:
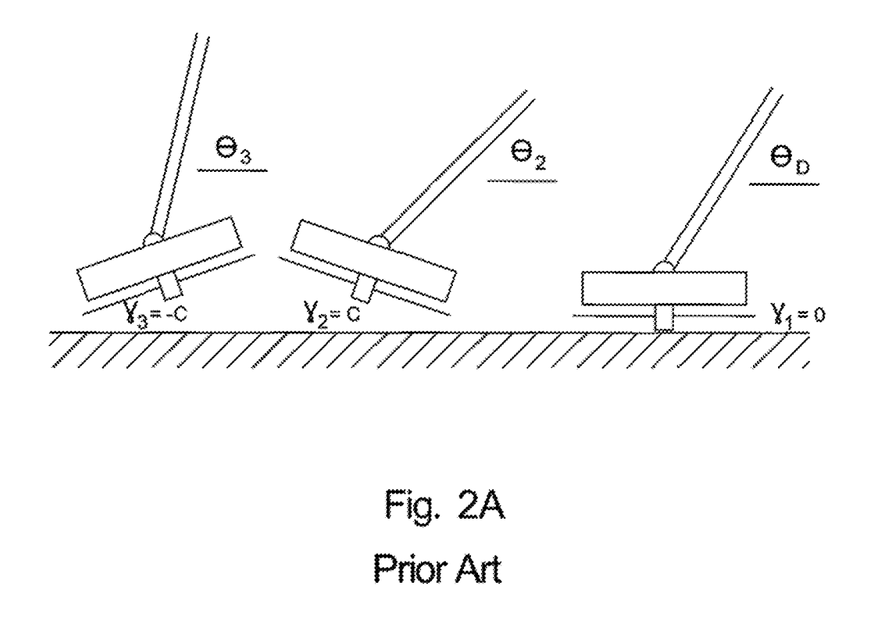
FIG. 2A is an illustration of the relationship between shaft angle and cutting plane orientation in prior art trimmers having a straight shaft.

Each of the prior art trimmers, straight and curved shaft, are configured such that at a design angle $\theta_D$, such that the cutting plane of the cutting disc 5 is parallel with the ground, in other words the angle $\alpha$ formed between the ground plane and the cutting plane is zero. These trimmers perform best when the cutting disc 5 is maintained at this attitude. FIG. 2A illustrates how the deviation of the shaft from the design $\theta_D$ deleteriously affects the attitude of the cutting plane. At an angle $\theta_2$ which is lower than the design angle $\theta_D$, the cutting plane angle with respect to the ground plane increases to $\alpha_2$ such that the forward portion of the cutting disc cuts the grass at a higher level than the back portion of the cutting disc.

Figure 2B:
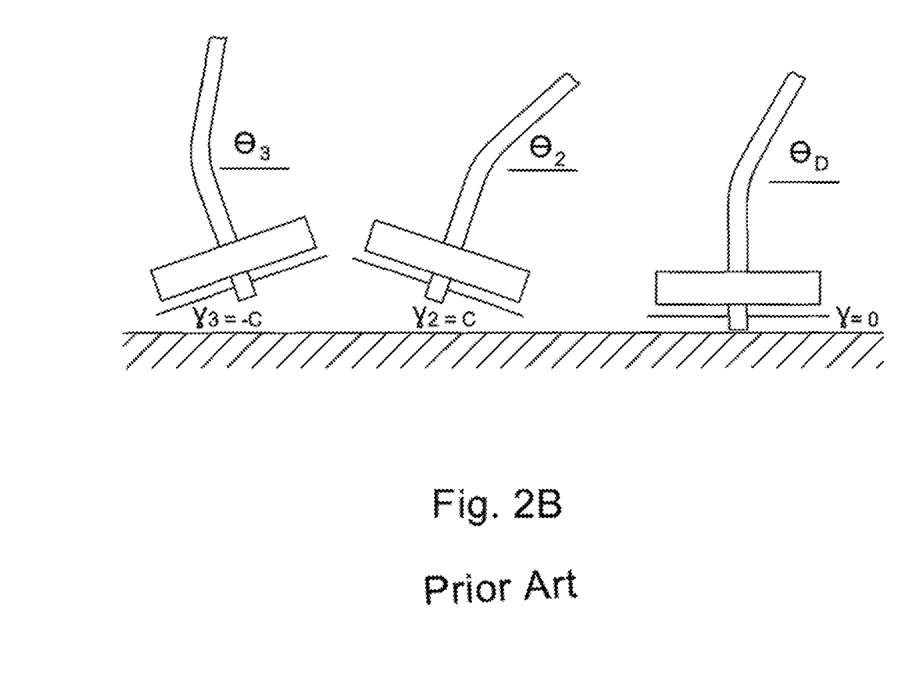
FIG. 2B is an illustration of the relationship between shaft angle and cutting plane orientation in prior art trimmers having a bent shaft.

Conversely, when the shaft is held relatively higher, $\theta_3$ is increased, resulting in a decrease in the cutting angle $\alpha_2$ such that the front of the cutting disc cuts the grass lower than the back end of the cutting disc 5. A similar result is evident with string trimmers utilizing curved or bent shafts as shown in FIG. 2B.

However, in order to maintain the cutting disc 5 at this parallel orientation, for most operators, the string trimmer must be held at an uncomfortable height or position. Operating the string trimmer under these conditions presents several problems, among them are the creation of spasms, sprains and strains on ligaments, tendons and muscles, the degeneration of intervertebral discs, and the resultant loss of flexion and inter vertebrae cushioning. In addition the resultant lower back strain, results in lower back pain which can lead to short term and long term health issues concerning the lower vertebrae.

The reach of typical string trimmers are also limited and fixed because of the relationship between the design angle $\theta_D$ and the angle of the cutting plane $\alpha$. As the reach is increased, the shaft angle $\theta$ decreases and conversely as the reach is decreased the shaft angle $\theta$ increases (see FIGS. 2A and 2B illustrating the detrimental effects of off design angle $\theta_D$ operations). Thus there is a need in the art for a solution that allows for the maintenance of the proper cutting plane orientation while allowing for different user height, operating preferences and reach.

SUMMARY

According to some aspects of the present disclosure, a lawn trimmer may include a motor, a straight shaft, a curved shaft, a rotor head, a cutting disc, a drive shaft; and a flexible drive shaft. The straight shaft may be co-axial with a shaft axis and a first shaft end and a second shaft end. The first shaft end may be proximate to the motor. The curved shaft may have a third shaft end and a fourth shaft end, the third shaft end may be proximate to the second shaft end, the third shaft end may be co-axial with the shaft axis, and the fourth shaft end may be co-axial with a second shaft axis, the second shaft axis may be parallel with the shaft axis and non-colinear. The drive shaft may be within the straight shaft; the drive shaft may be connected to the motor and extend from the first end of the straight shaft, the second end of the straight shaft, and connect to the flexible drive shaft at the second end. The drive shaft may translate the rotation of the motor to the flexible drive shaft. The flexible drive shaft may be within the curved shaft and extend from a third end of the curved shaft to the fourth end of the curved shaft. The rotor head attached to the fourth end of the curved shaft and interact with the flexible drive shaft. The rotor head translating the rotation of the flexible drive to the cutting disc. The cutting disc including a plurality of cutting blades rotating about an axis perpendicular to a cutting plane, an intersection between the cutting plane and the second shaft axis defining a predetermined oblique angle.

In some embodiments, the cutting blades may be strings. In some embodiments, the curved shaft's orientation about the shaft axis may be variable and selected via a clamp. In some embodiments, the rotor head's orientation about the second shaft axis may be variable and selected via a clamp. In other embodiments the rotor head's orientation about the second shaft axis and the curved shaft's orientation about the shaft axis may be coupled. In some embodiments, the lawn trimmer may further include a variable length interface between the shaft and the curved shaft, wherein one of the second end of the shaft and the third end of the curved shaft slides over the other of the second end and the third end to form an overlap. In some embodiments, an overlap is variable and may be selectable via a clamp. In some embodiments, the lawn mower trimmer may further include a variable length drive shaft interface between the drive shaft and flexible drive shaft, such that one of the drive shaft and flexible drive shaft slidably receives the other of the drive shaft and flexible drive shaft to form a drive overlap and transfer rotation of the drive shaft to the flexible drive shaft. In some embodiments, the drive overlap may be a function of the shaft overlap. In some embodiments, the lawn trimmer may further include a shaft reference point fixed with respect to the shaft, the perpendicular offset of the reference point with respect to the cutting plane in an operational position of the lawn trimmer is a function of at least the predetermined angle, and the curved shaft's selected orientation about the shaft. In some embodiments, the perpendicular offset may be also a function of the curve of the curved shaft. In some embodiments, the lawn trimmer may further include a shaft reference point fixed with respect to the shaft, the perpendicular offset of the reference point with respect to the cutting plane in an operational position of the lawn trimmer may be a function of at least the predetermined angle, the overlap and the curved shaft's selected orientation about the shaft. In some embodiments, the perpendicular offset may also be a function of the curve of the curved shaft.

According to other aspects of the disclosure, a lawn trimmer may include, a motor, a straight shaft, a curved shaft, a rotor head, a cutting disc, a drive shaft; and a flexible drive shaft. The straight shaft may be co-axial with a shaft axis, a first shaft end, and a second shaft end. The first shaft end may be proximate to the motor. The curved shaft may have a first curve portion and a second curve portion. The first curve portion may have a third shaft end and a fourth shaft end. The second curved portion may have a fifth shaft end and a sixth shaft end. The third shaft end may be proximate to the second shaft end; the third shaft end may be co-axial with the shaft axis, and the fourth shaft end may be co-axial with a second shaft axis. The second shaft axis may be parallel with the shaft axis and non-colinear; the fifth shaft end may be proximate to the fourth shaft end. The fifth shaft end may be co-axial with the second shaft axis and the sixth shaft end may be co-axial with a third shaft axis. The third shaft axis may be parallel with the second shaft axis and non-colinear. The drive shaft may be within the straight shaft; the drive shaft may be connected to the motor and extend from the first end of the straight shaft and the second end of the straight shaft and connect to the flexible drive shaft at the second end. The drive shaft may translate the rotation of the motor to the flexible drive shaft. The flexible drive shaft may be within the curved shaft and extend from a third end of the curved shaft to the sixth end of the curved shaft. The rotor head may be attached to the fourth end of the curved shaft and interact with the flexible drive shaft. The rotor head may translate the rotation of the flexible drive to the cutting disc. The cutting disc may include a plurality of cutting blades rotating about an axis perpendicular to a cutting plane. An intersection between the cutting plane and the third shaft axis may define a predetermined oblique angle.

In some embodiments, the orientation of the third end about the shaft axis may be variable and selected via a clamp, and the orientation of the fifth end about the second axis may be variable and selected via a clamp. In some embodiments, the rotor head's orientation about the third shaft axis may be variable and selected via a clamp. In some embodiments, the lawn trimmer may further comprise a variable length interface between the shaft and the curved shaft. One of the second end of the shaft and the third end of the curved shaft may slide over the other of the second end and the third end to form an overlap. In some embodiments, the lawn trimmer may further include a shaft reference point fixed with respect to the shaft. The perpendicular offset of the reference point with respect to the cutting plane in an operational position of the lawn trimmer may be a function of at least the predetermined angle. The selected orientation of the third end may be about the shaft axis, and the select orientation of the fifth end may be about the second shaft axis. The lawn trimmer may further include a shaft reference point fixed with respect to the shaft. The perpendicular offset of the reference point with respect to the cutting plane in an operational position of the lawn trimmer may be a function of at least the predetermined angle. The selected orientation of the third end may be about the shaft axis, and the select orientation of the fifth end may be about the second shaft axis. The perpendicular offset of the reference point may be at a maximum value when the first and second curve portions are in a first plane with the shaft, the first plane being perpendicular to the cutting plane, and the sixth end may not be co-linear with the second end.

BRIEF DESCRIPTION OF THE DRAWINGS

The following will be apparent from elements of the figures, which are provided for illustrative purposes.

The present application discloses illustrative (i.e., example) embodiments. The claimed inventions are not limited to the illustrative embodiments. Therefore, many implementations of the claims will be different than the illustrative embodiments. Various modifications may be made to the claimed inventions without departing from the spirit and scope of the disclosure. The claims are intended to cover implementations with such modifications.

DETAILED DESCRIPTION

For the purposes of promoting an understanding of the principles of the disclosure, reference will now be made to a number of illustrative embodiments in the drawings and specific language will be used to describe the same.

Figure 3:
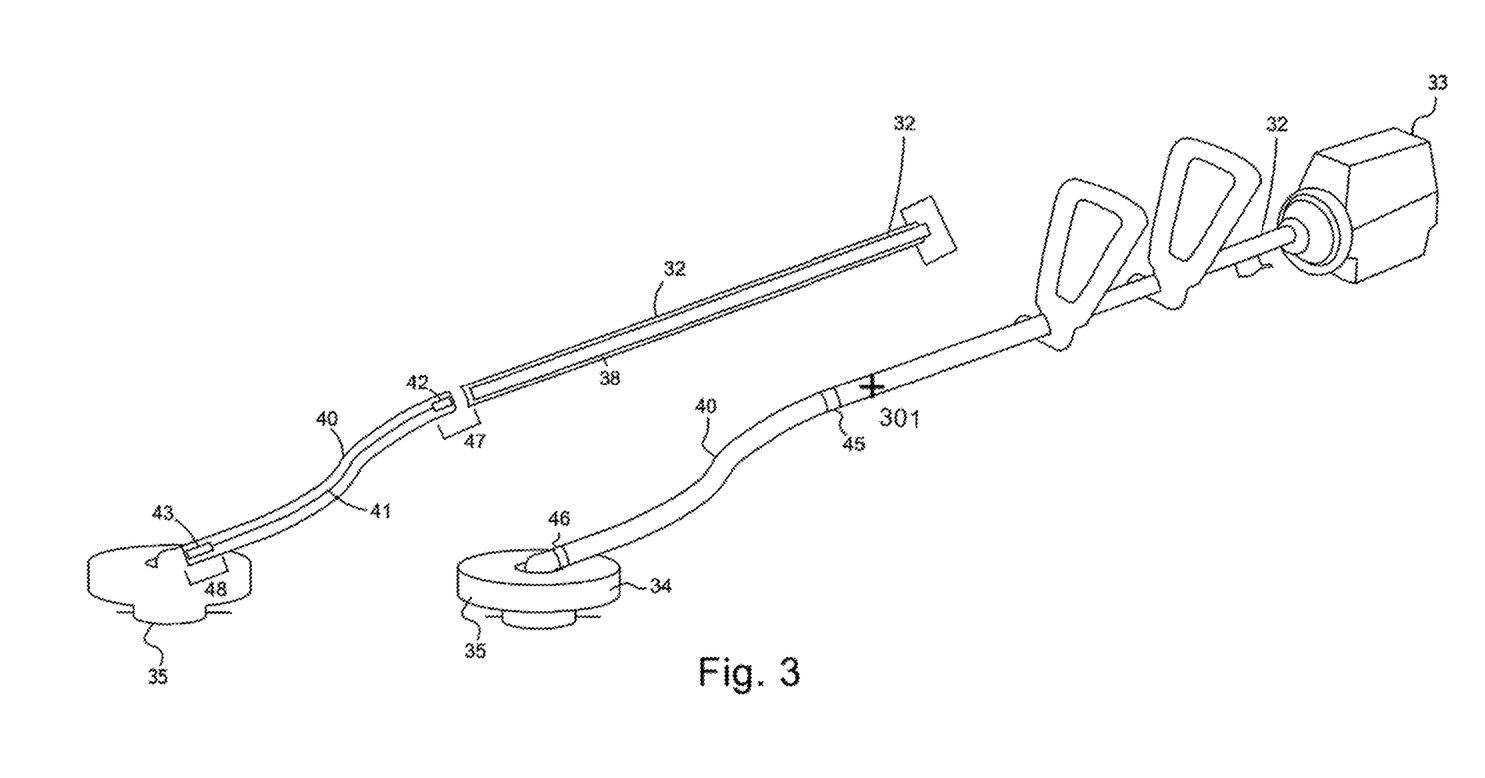
FIG. 3 is an illustration of a string trimmer according to embodiments of the disclosed subject matter.

An embodiment of the string trimmer is described with respect to FIG. 3. The trimmer includes a motor 33 for driving the trimmer, the motor is preferable a combustion engine (gasoline, Diesel, propane, natural gas etc.) but in is also envisioned the motor may be electrically driven with a power source (cord, battery, fuel cell) The motor 33 is rigidly connected to a straight shaft 32 and drives the drive shaft 38 internal to the straight shaft 32. The drive shaft 38 is generally coaxial with the straight shaft 32 and may be so positioned with a number of bearings distributed along the shaft 32. The shaft 32 may also include one or more user handles and or controls (throttle, on/off switch, etc.). The shaft 32 is connected to a curved shaft 40, the curved shaft 40 including a flexible drive shaft 41 which connects to the end of drive shaft 38 via interface 42 and transfers the torque from the drive shaft 38 to the rotor head 34.

The curved shaft is rotatably connected to the straight shaft 32 via a clamping device 45 at one end and rotatably connected to the rotor head 34 via clamping device 46. The clamping devices 45 and 46 fix the circumferential position (i.e. offset/rotation) of the curved shaft 40 with respect to straight shaft 32 and the curved shaft 40 with respect to the rotor head 34 respectively. The circumferential offset is preferably selectable from 0-180 degrees.

Figure 4:
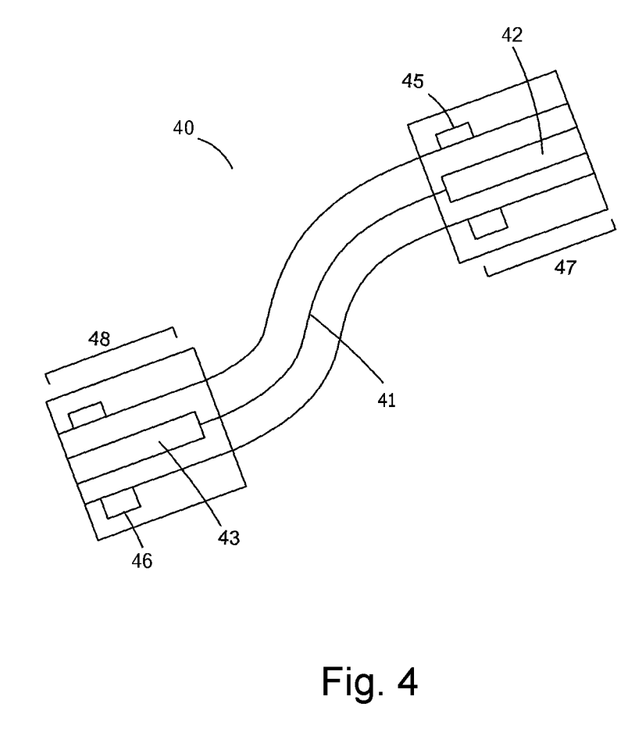
FIG. 4 is an illustration of a curved section of the string trimmer shaft according to embodiments of the disclosed subject matter.

The curved shaft 40, as shown in FIGS. 3 and 4, has opposite end portions 47 and 48 that are not curved, rather end portion 47 is co-axial with the straight shaft 32 and end portion 48 is co-axial with a second axis which is parallel to the axis of the straight shaft. Because of the curve in the portion between the ends 47 and 48, the axis of the straight shaft and the second axis are not co-linear. However, it is preferably that the curved shaft 40 is substantially planar (i.e. the curve being two dimensional).

The rotor head 34 includes a cutting disc 35. The rotor head 34 translate the rotation of the flexible drive shaft 41 to the cutting disc 35. The rotor head 34 receives the torque from the drive shaft 38 via interface 43. The cutting disc 35 including a plurality of blades (e.g. string, articulated blades or fixed blades) that rotate within a cutting plane that by design is parallel to the ground surface 300, or perpendicular to the ground surface 300 for edging operations.

The intersection between the ground plane and each of the shaft axis and the second shaft axis defining a predetermined design angle $\theta_D$ (as shown in FIG. 2A) when the trimmer is in its operational attitude such that the cutting plane is parallel to the ground plane 300. In order to maintain the cutting plane and ground plane 300 parallel, while allowing for different user heights (i.e. perpendicular offsets), the circumferential offset of the rotor head 35 with respect to the curved shaft 40 the same as the circumferential offset of the straight shaft 32 with respect to the curved shaft 40. For example if the curved shaft 40 is rotated clockwise 90 degrees with respect the straight shaft 32, then the curved shaft should be also rotated clockwise 90 degrees with respect to the rotor head 35 (i.e. the rotor head should be rotated counter clockwise 90 degrees with respect to the curved shaft 40)

Figure 5A:
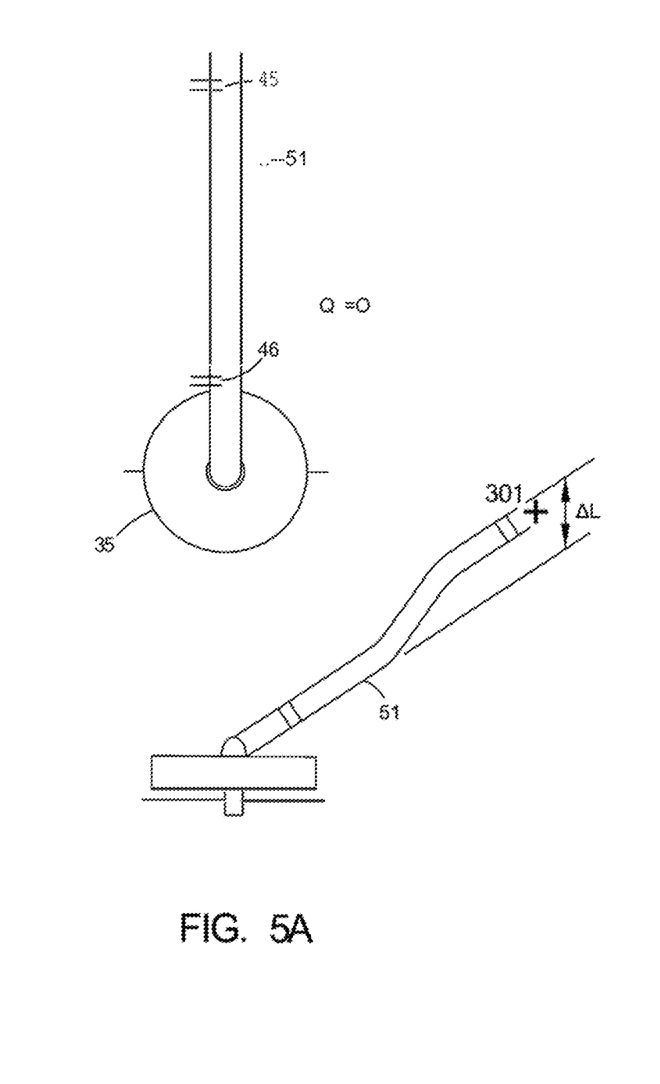
FIG. 5A is an illustration of the relationship of the orientation of the curved portion of the shaft and the shaft height according to embodiments of the disclosed subject matter.
Figure 5B:
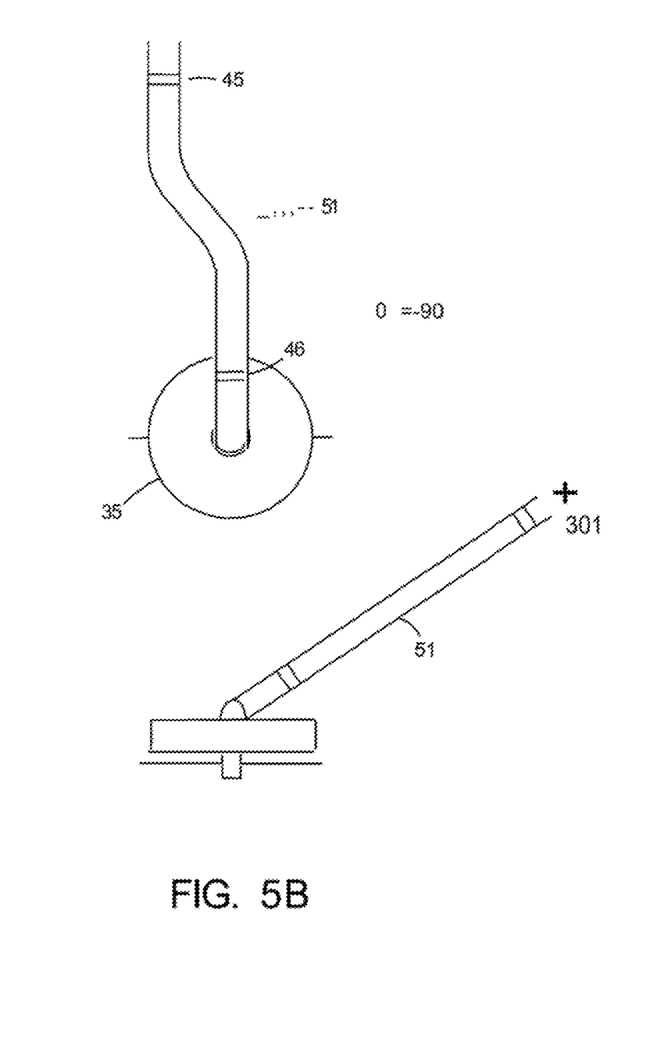
FIG. 5B is an illustration of the relationship of the orientation of the curved portion of the shaft and the shaft height according to embodiments of the disclosed subject matter.

A shaft reference point 301 is fixed with respect to the shaft, and the perpendicular offset of the reference point with respect to the cutting plane, which allows for varying heights of the user, becomes a function of the predetermined angle (i.e. $\theta_D$), and the curved shaft's selected rotation about the shaft 32. FIGS. 5A and 5B includes examples of the curved shaft 51 at the same predetermined angle $\theta_D$ but differing circumferential offsets $\Omega$ illustrating the how the relationship allows for varying user height and holding preferences.

FIG. 5A shows an increase in perpendicular offset of the reference point of $\Delta L$ when $\Omega$ equal 0 as compared to FIG. 5B where the circumferential offset $\Omega$ is −90 (or 90 degrees clockwise). Thus the perpendicular offset may be adjusted between 0 and $\Delta L$ by selectively varying the circumferential offset $\Omega$ from 0 to 90 degrees. This advantageously As shown in FIGS. 5A and 5B, this relationship between the angular displacement (circumferential offset) of the curved portion of the shaft and perpendicular offset (i.e. shaft height of reference point) enables the user to adjust the curved shaft 40 to meet the design angle $\theta_D$ while accounting for the individual height of the user or the preferred operating attitude/posture of the user. This relationship also allowed for the incorporation of a variable length shaft that enables increasing or decreasing the range of the trimmer without adversely affecting the orientation of the cutting plane.

Figure 6:
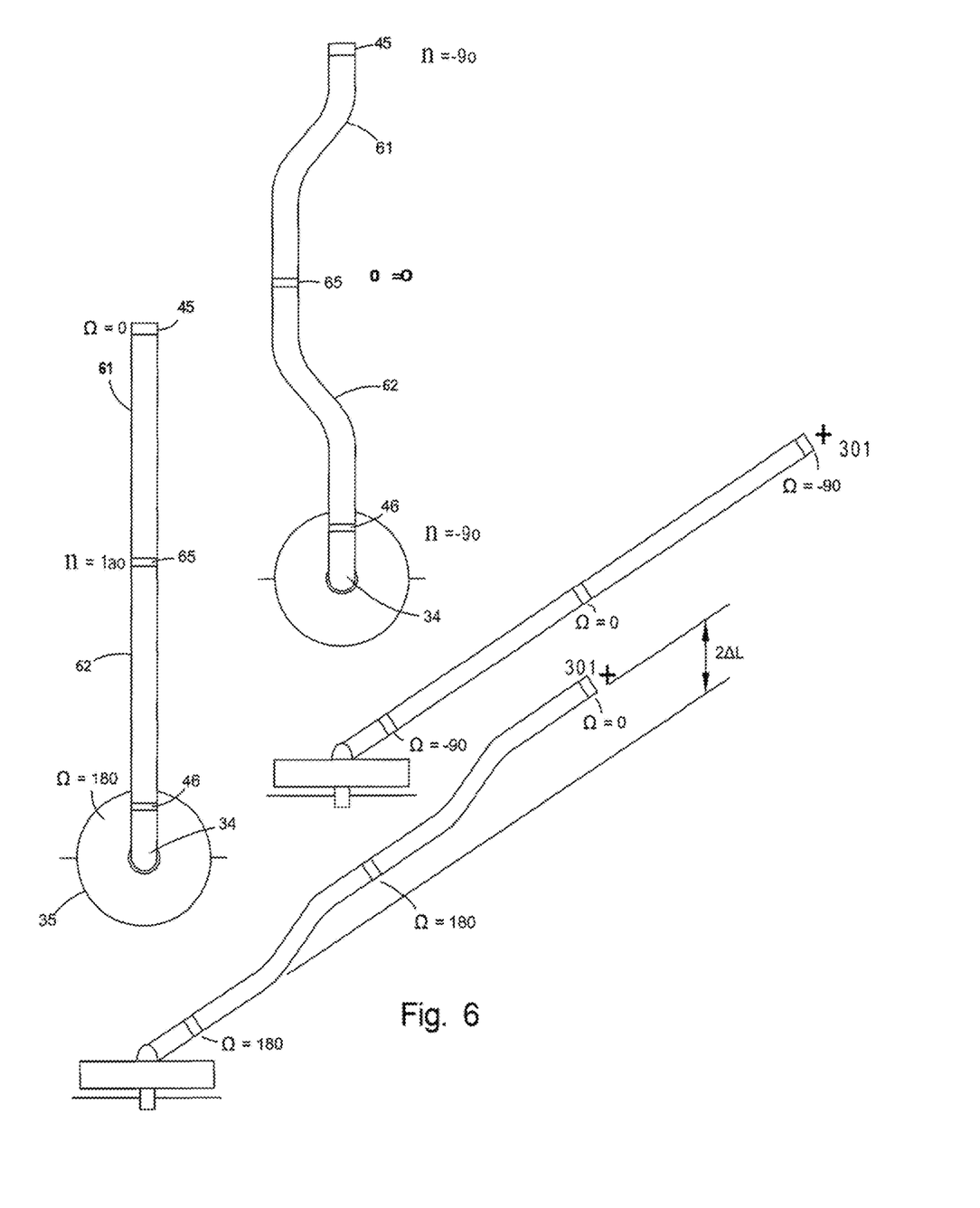
FIG. 6 is an illustration of the relationship of the orientation of a compound curved portion of the shaft and the shaft height according to embodiments of the disclosed subject matter.

The use of two complimentary curved portions 61, 62 in the curved shaft 40 as shown in FIG. 6, allows for height adjustment while maintaining alignment of the shaft 32 and rotor head 34 in a vertical plane. Like the single piece curved shaft embodiment of FIGS. 3 and 4, the adjustment of the circumferential offset of the curved shaft 40 with respect to the straight shaft 32 varies the perpendicular offset, however, the circumferential offset between the two portions 61, 62 of the curved shaft 40 allows the change in height to be increased ($2\Delta L$). Thus by adjusting the circumferential offsets at clamps 45, 46 and 65, the perpendicular offset (reference point height) may be varied from the design height $L_D$ by as much as $2\Delta L$, while preferably maintaining the rotor head 34 in same vertical planes as the shaft 32. While this alignment is not required for operation, the user may be more comfortable with such an arrangement. FIG. 6 illustrates examples of configurations with no change in perpendicular offset to a maximum offset change. At the design height DH, the respective offsets of at clamping members 45, 65 and 46 are −90, 0 and −90, while at the maximum height $L_D+2\Delta L$ the respective offsets are 0, 180 and 180 degrees.

Figure 7:
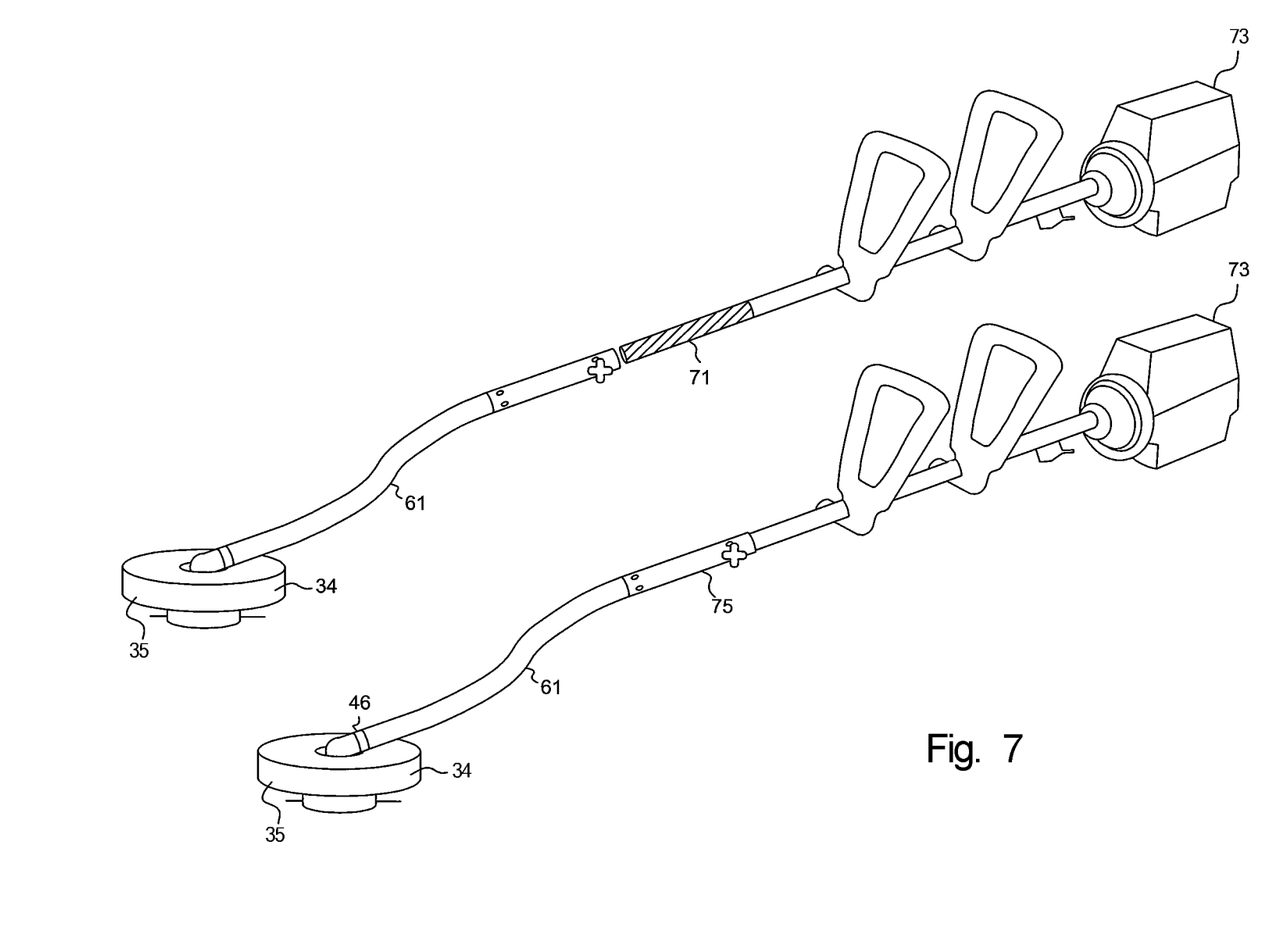
FIG. 7 is an illustration of a string trimmer with variable shaft length according to an embodiment of the disclosed subject matter.

FIG. 7 illustrates a variable shaft length variation of the string trimmer. A variable length drive shaft interface includes an internal portion 71 and an external overlapping portion 75 which allows the shafts 32 and 40 as well as the drive shaft 38 and flexible drive shaft 41 to engage one another by sliding. As shown in FIG. 7, the straight shaft 32 slides into the flexible shaft 40, however the reverse is also envisioned. Furthermore, the relative orientation of the drives shafts 38 and 41 may also be reversed.

Figure 8:
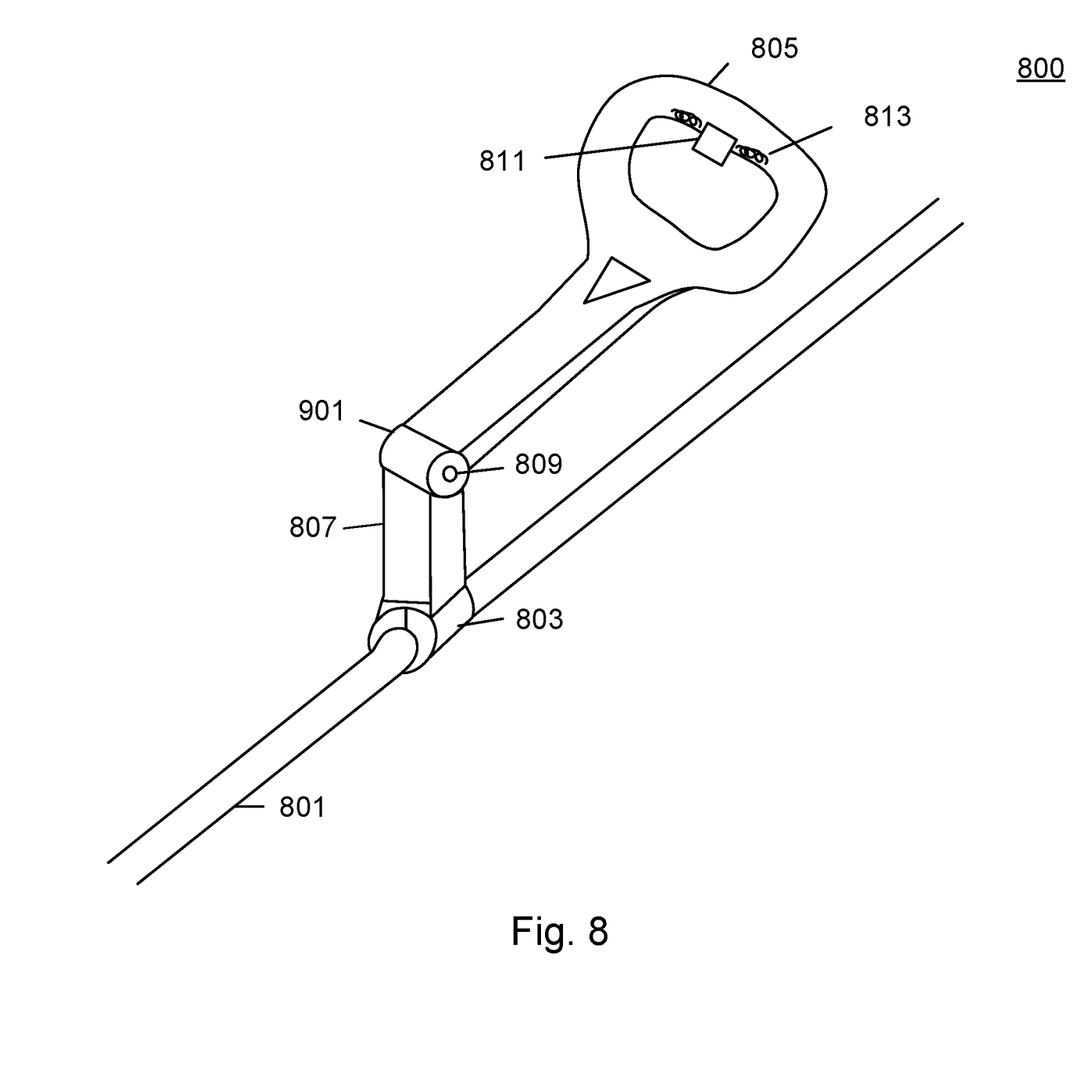
FIG. 8 is an illustration of an adjustable handle according to an embodiment of the disclosed subject matter.

FIG. 8 illustrates an adjustable handle variation of the string trimmer. The adjustable handle allows for repositioning of the handle without the need of manipulating screws of a wingnut. The handle comes up from the trimmer shaft several inches and the top is angled back to the trimmer operator, thus enabling the operator to maintain an upright posture, without having to bend or lunge at a downward angle, thereby reducing discomfort of the operator. The adjustable handle 800 is clamped on to a shaft 801 by cylinder arms 803. The cylinder arms may be able to fit different diameters of trimmer exterior shafts, as well as brooms, rakes, shovels mops, etc. The cylinder arms 803 may be physical connected to the lower part 807 of the handle and may be in physical communication with a release button 811 in the upper part 805 of the handle. The cylinder arms 803 open once the release button 811 is pressed allowing the handle to slide up and down, or rotate around the shaft 801. Coiled tension springs 813 may be used to facilitate the physical communication between the release button 811 and the cylinder arms 803. Joint 900 connects the upper part 805, and the lower part 807 of adjustable handle 800.

Figure 9:
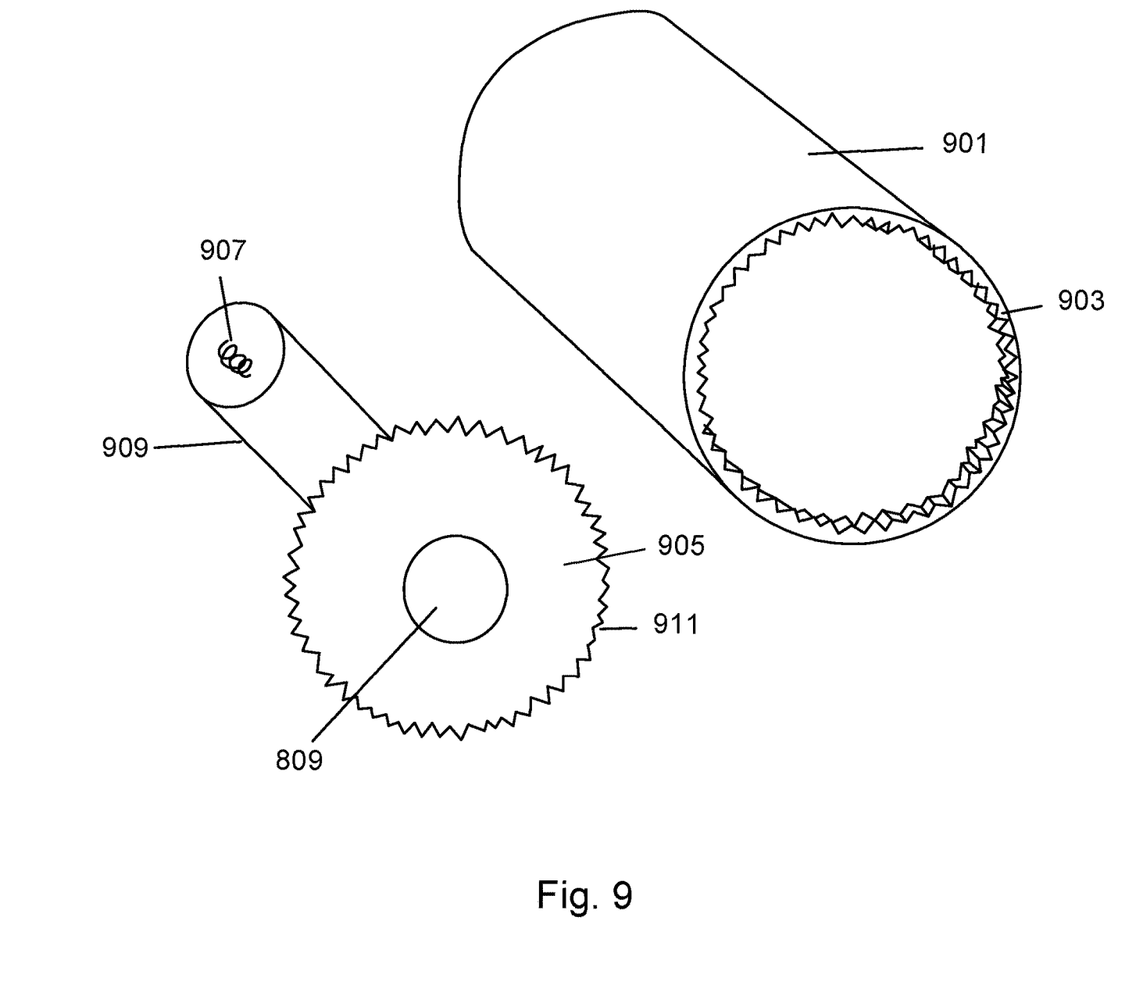
FIG. 9 is an illustration of a joint in the adjustable handle according to an embodiment of the disclosed subject matter.

FIG. 9 depicts two main components of joint 900. The outer cylinder 901 may have outer teeth 903 the protrude inward and extend a set distance into the cylinder. The insert cylinder 909 may be connected to a disk 905 with inner teeth 911 that protrude outward and are sized to fit within and communicate with the outer teeth 903 of the outer cylinder. The communication between the inner teeth 911 and the outer teeth 903 hold the adjustable handle in place. When button 809 is depressed the insert cylinder move into the outer cylinder disengage the inner teeth from the outer teeth allowing adjustment of the upper part 805 of the adjustable handle. A spring 907 moves the insert cylinder to reengage the inner teeth 911 with the outer teeth 903.

Figure 10:
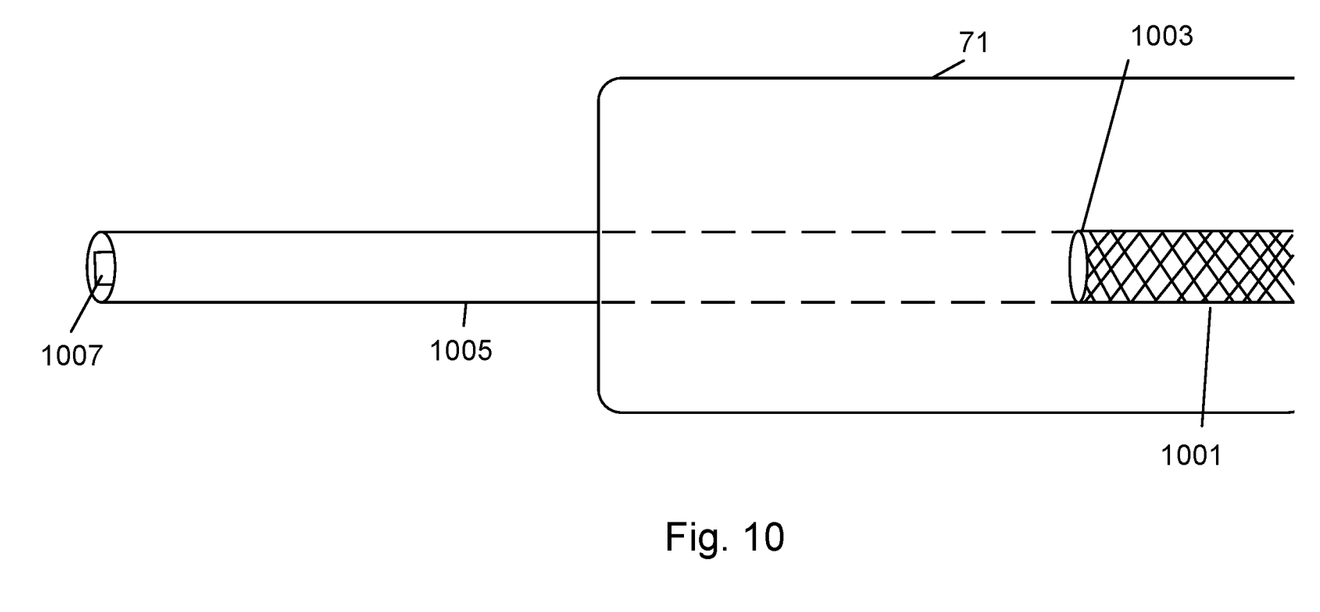
FIG. 10 is an illustration of an upper portion of the variable length shaft according to an embodiment of the disclosed subject matter.

FIG. 10 depicts the upper portion of an embodiment of the variable length shaft depicted in FIG. 7. The internal portion 71 houses a steel flex cable 1001 which is connected to the drive shaft. The steel flex cable is connected via a weld seam 1003 or other comment fastening mechanism to a sleeve 1005. The sleeve 1005 contains a square hole 1007 extending the length of the sleeve. In some embodiment the square hole is sized to have internal side of ¼ of an inch. In some embodiments the sleeve is sized to accommodate 10 inches of travel, however more or less is envisioned.

Figure 11:
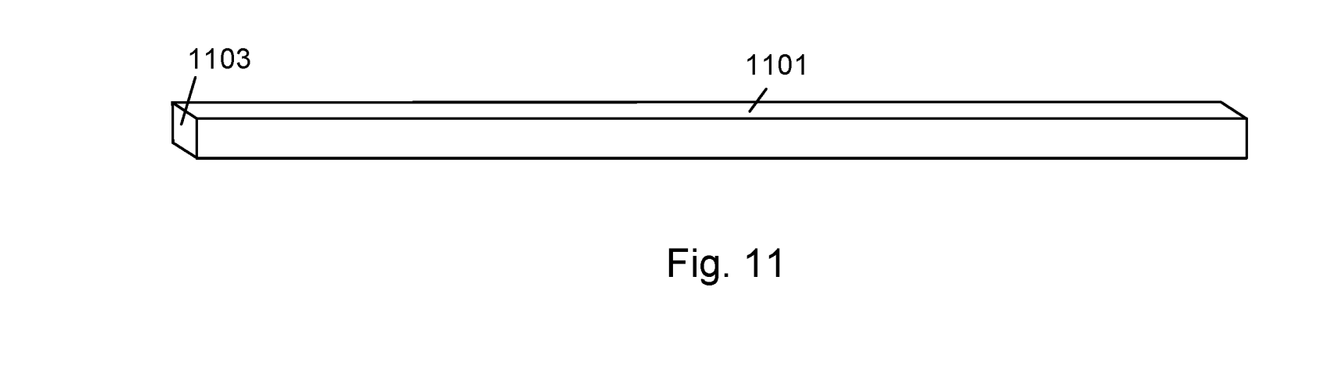
FIG. 11 is an illustration of key stock modified for use in the variable length shaft according to the disclosed subject matter.

FIG. 11 illustrates square steel cable 1101. The square steel cable 1101 may be grinded down to fit the square hole 1007. In some embodiments, the square steel cable 1101 may have sides of slightly less than ¼ of an inch. One end of the square steel cable 1101 may be welded to the flexible drive shaft 41. In some embodiment the square steel cable 1101 may be welded to a flex cable the communicates with the flexible drive shaft through a connector.

Figure 12:
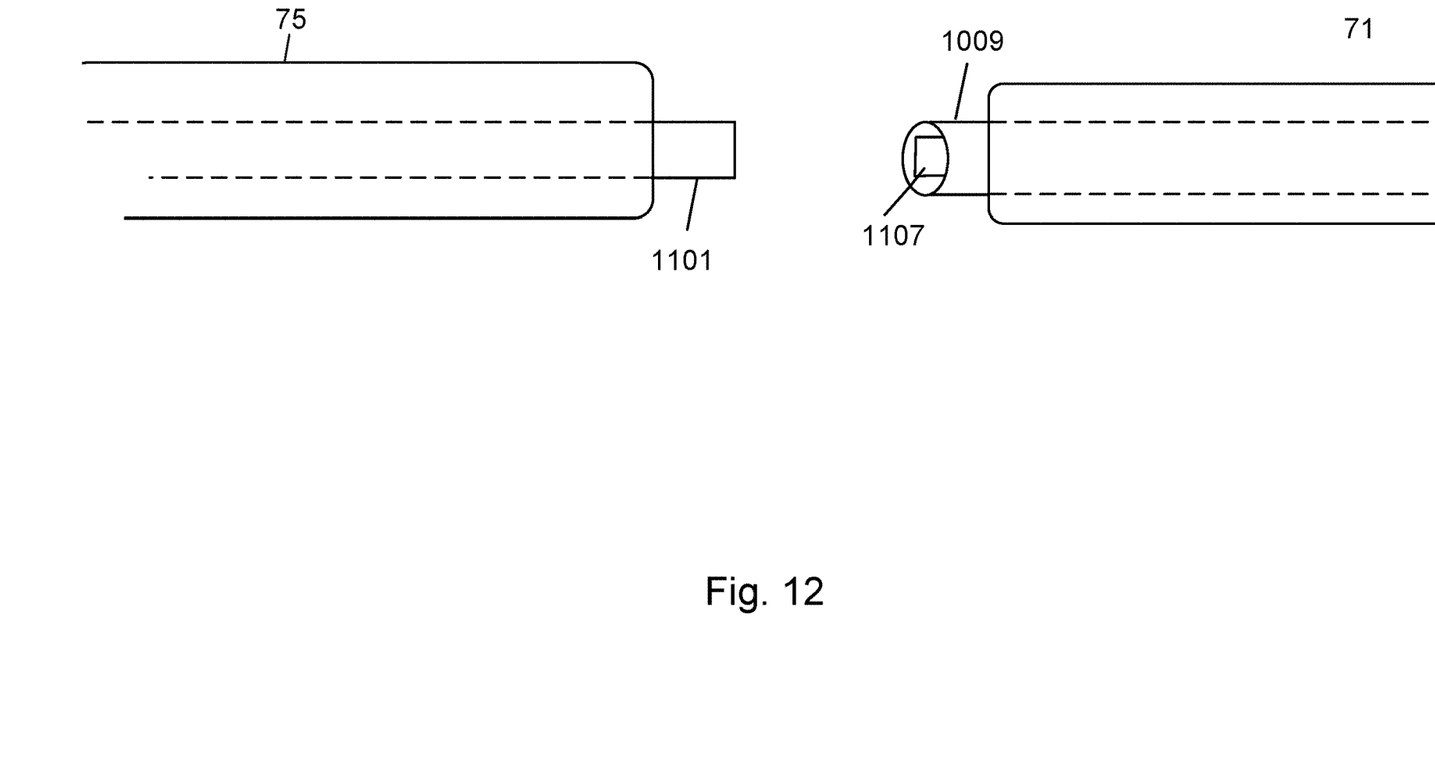
FIG. 12 is an illustration of the connection for the variable length shaft according to an embodiment of the disclosed subject matter.

FIG. 12 illustrates the intersection of the variable length shaft. The external overlapping portion 75 may be slightly larger than the internal portion 71. In some embodiments the external overlapping portion may be sized with an clearance of 1/16 of an inch between the inner diameter of the external overlapping portion 75 and the outer diameter of the internal portion 71. The square steel cable 1101 will extend through the overlapping portion to physically interact to interface 42. The steel stock cable 1101 may slide into the square hole, enabling the drive shaft 38 to physically communicate with the flexible drive shaft 41. In some embodiments the variable length shaft may be an variable extension shaft inserted between the curved shaft 40 and the straight shaft 32, which physically communicates with drive shaft 38 and the flexible drive shaft 41 though interfaces.

An aspect of the disclosure subject matter envisions the use of string, articulating blades and fixed blades designed to operate generally within the cutting plane.

Another aspect of the disclosed subject matter includes the use of gears within the curved portion of the shaft in lieu of or in conjunction with a flexible shaft.

Although examples are illustrated and described herein, embodiments are nevertheless not limited to the details shown, since various modifications and structural changes may be made therein by those of ordinary skill within the scope and range of equivalents of the claims.

What is claimed is:

1. A lawn trimmer comprising:
a motor;
a straight shaft;
a curved shaft;
a rotor head;
a cutting disc;
a drive shaft; and
a flexible drive shaft;
the straight shaft co-axial with a shaft axis and having a first shaft end and a second shaft end, the first shaft end proximate to the motor;
the curved shaft having a third shaft end and a fourth shaft end, the third shaft end proximate to the second shaft end, the third shaft end is co-axial with the shaft axis, and the fourth shaft end is co-axial with a second shaft axis, the second shaft axis being parallel with the shaft axis and non-colinear;
the drive shaft being within the straight shaft; the drive shaft connected to the motor and extending from the first end of the straight shaft and the second end of the straight shaft and connecting to the flexible drive shaft at the second end, the drive shaft translating the rotation of the motor to the flexible drive shaft;
the flexible drive shaft being within the curved shaft and extending from a third end of the curved shaft to the fourth end of the curved shaft; the rotor head attached to the fourth end of the curved shaft and interacting with the flexible drive shaft
the rotor head translating the rotation of the flexible drive to the cutting disc;
the cutting disc including a plurality of cutting blades rotating about an axis perpendicular to a cutting plane, an intersection between the cutting plane and the second shaft axis defining a predetermined oblique angle.

2. The lawn trimmer of claim 1, wherein the cutting blades are strings.

3. The lawn trimmer of claim 1, wherein the curved shaft's orientation about the shaft axis is variable and selected via a clamp.

4. The lawn trimmer of claim 3, wherein the rotor head's orientation about the second shaft axis is variable and selected via a clamp.

5. The lawn trimmer of claim 4, wherein the rotor head's orientation about the second shaft axis and the curved shaft's orientation about the shaft axis are coupled.

6. The lawn trimmer of claim 4, further comprising a shaft reference point fixed with respect to the shaft, the perpendicular offset of the reference point with respect to the cutting plane in an operational position of the lawn trimmer is a function of at least the predetermined angle, and the curved shaft's selected orientation about the shaft.

7. The lawn trimmer of claim 6, wherein the perpendicular offset is also a function of the curve of the curved shaft.

8. The lawn trimmer of claim 1, further comprising a variable length interface between the shaft and the curved shaft, wherein one of the second end of the shaft and the third end of the curved shaft slides over the other of the second end and the third end to form an overlap.

9. The lawn trimmer of claim 8, wherein an overlap is variable and is selectable via a clamp.

10. The lawn trimmer of claim 9, further comprising a shaft reference point fixed with respect to the shaft, the perpendicular offset of the reference point with respect to the cutting plane in an operational position of the lawn trimmer is a function of at least the predetermined angle, the overlap and the curved shaft's selected orientation about the shaft.

11. The lawn trimmer of claim 10, wherein the perpendicular offset is also a function of the curve of the curved shaft.

12. A lawn trimmer comprising:
a motor;
a straight shaft;
a curved shaft;
a rotor head;
a cutting disc;
a drive shaft; and
a flexible drive shaft;
the straight shaft co-axial with a shaft axis and having a first shaft end and a second shaft end, the first shaft end proximate to the motor;
the curved shaft having a third shaft end and a fourth shaft end, the third shaft end proximate to the second shaft end, the third shaft end is co-axial with the shaft axis, and the fourth shaft end is co-axial with a second shaft axis, the second shaft axis being parallel with the shaft axis and non-colinear;

the drive shaft being within the straight shaft; the drive shaft connected to the motor and extending from the first end of the straight shaft and the second end of the straight shaft and connecting to the flexible drive shaft at the second end, the drive shaft translating the rotation of the motor to the flexible drive shaft;

the flexible drive shaft being within the curved shaft and extending from a third end of the curved shaft to the fourth end of the curved shaft; the rotor head attached to the fourth end of the curved shaft and interacting with the flexible drive shaft the rotor head translating the rotation of the flexible drive to the cutting disc;

the cutting disc including a plurality of cutting blades rotating about an axis perpendicular to a cutting plane, an intersection between the cutting plane and the second shaft axis defining a predetermined oblique angle;

a variable length interface between the shaft and the curved shaft, wherein one of the second end of the shaft and the third end of the curved shaft slides over the other of the second end and the third end to form an overlap, and a variable length drive shaft interface between the drive shaft and flexible drive shaft, wherein one of the drive shaft and flexible drive shaft slidably receives the other of the drive shaft and flexible drive shaft to form a drive overlap and transfer rotation of the drive shaft to the flexible drive shaft.

13. The lawn trimmer of claim 12, wherein the drive overlap is a function of the shaft overlap.

14. A lawn trimmer comprising:
a motor;
a straight shaft;
a curved shaft;
a rotor head;
a cutting disc;
a drive shaft; and
a flexible drive shaft;
the straight shaft co-axial with a shaft axis and having a first shaft end and a second shaft end, the first shaft end proximate to the motor;
the curved shaft having a first curve portion and a second curve portion;
the first curve portion having a third shaft end and a fourth shaft end;
the second curved portion having a fifth shaft end and a sixth shaft end;
the third shaft end proximate to the second shaft end, the third shaft end is co-axial with the shaft axis, and the fourth shaft end is co-axial with a second shaft axis, the second shaft axis being parallel with the shaft axis and non-colinear;
the fifth shaft end proximate to the fourth shaft end, the fifth shaft end is co-axial with the second shaft axis and the sixth shaft end is co-axial with a third shaft axis, the third shaft axis being parallel with the second shaft axis and non-colinear;
the drive shaft being within the straight shaft; the drive shaft connected to the motor and extending from the first end of the straight shaft and the second end of the straight shaft and connecting to the flexible drive shaft at the second end, the drive shaft translating the rotation of the motor to the flexible drive shaft;
the flexible drive shaft being within the curved shaft and extending from a third end of the curved shaft to the sixth end of the curved shaft; the rotor head attached to the fourth end of the curved shaft and interacting with the flexible drive shaft;
the rotor head translating the rotation of the flexible drive to the cutting disc;
the cutting disc including a plurality of cutting blades rotating about an axis perpendicular to a cutting plane, an intersection between the cutting plane and the third shaft axis defining a predetermined oblique angle.

15. The lawn trimmer of claim 14, wherein the orientation of the third end about the shaft axis is variable and selected via a clamp, and the orientation of the fifth end about the second axis is variable and selected via a clamp.

16. The lawn trimmer of claim 15, wherein the rotor head's orientation about the third shaft axis is variable and selected via a clamp.

17. The lawn trimmer of claim 15, further comprising a variable length interface between the shaft and the curved shaft, wherein one of the second end of the shaft and the third end of the curved shaft slides over the other of the second end and the third end to form an overlap.

18. The lawn trimmer of claim 17, further comprising a shaft reference point fixed with respect to the shaft, the perpendicular offset of the reference point with respect to the cutting plane in an operational position of the lawn trimmer is a function of at least the predetermined angle, the selected orientation of the third end about the shaft axis, and the select orientation of the fifth end about the second shaft axis.

19. The lawn trimmer of claim 17, wherein the perpendicular offset of the reference point at a maximum value when the first and second curve portions are in a first plane with the shaft, the first plane being perpendicular to the cutting plane, and the sixth end is not co-linear with the second end.

20. The lawn trimmer of claim 15, further comprising a shaft reference point fixed with respect to the shaft, the perpendicular offset of the reference point with respect to the cutting plane in an operational position of the lawn trimmer is a function of at least the predetermined angle, the selected orientation of the third end about the shaft axis, and the select orientation of the fifth end about the second shaft axis.

* * * * *